(No Model.)

F. W. HOEFER.
HAND TRUCK.

No. 392,609. Patented Nov. 13, 1888.

Witnesses.
Harry S. Rohrer
Schuyler Durgee

Inventor,
Fred. W. Hoefer.
By his Attorneys
Wiles & Greene

UNITED STATES PATENT OFFICE.

FRED W. HOEFER, OF FREEPORT, ILLINOIS.

HAND-TRUCK.

SPECIFICATION forming part of Letters Patent No. 392,609, dated November 13, 1888.

Application filed March 8, 1888. Serial No. 266,548. (No model.)

*To all whom it may concern:*

Be it known that I, FRED W. HOEFER, a resident of Freeport, in the county of Stephenson and State of Illinois, have invented certain new and useful Improvements in Hand-Trucks; and I do hereby declare the following to be a full, clear, and exact description of the invention, such as will enable others skilled in the art to which it pertains to make and use the same.

My invention relates to improvements in hand-trucks of the class provided with vertically-adjustable platforms, and is fully described and explained in this specification and shown in the accompanying drawings, in which—

Figure 1:
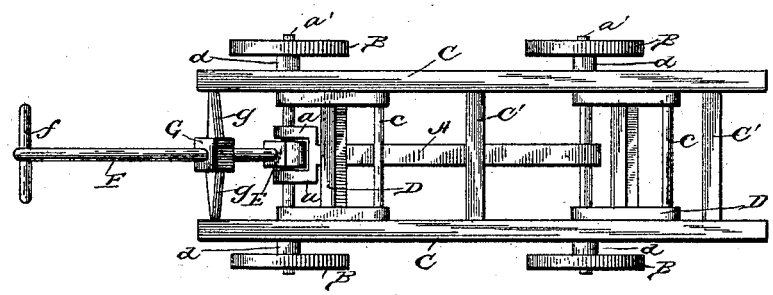
Figure 2:
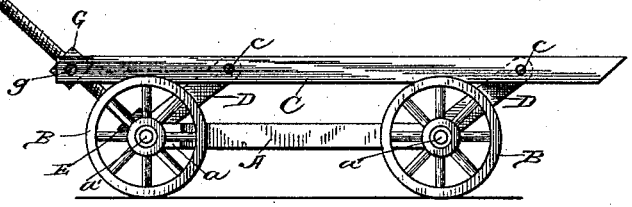
Figure 3:
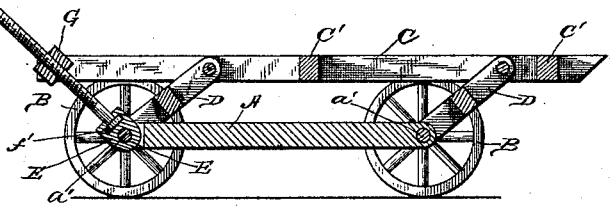

Figure 1 is a top plan of a truck embodying my improvements. Fig. 2 is a side elevation thereof, and Fig. 3 is a longitudinal central vertical section thereof.

In the views, A is the preferably single bed-piece of the truck having its rear end bifurcated to form ears $a$ $a$, separated by a suitable space. Axles $a'$ $a'$ pass through the front and rear ends of the bed-piece, and suitable wheels, B, are mounted on the axles and support the bed-piece. Above the bed-piece A is a platform formed of parallel side pieces, C C, and one or more cross-pieces, C', the width of the platform being such that it can move freely up and down in the space between the wheels on opposite sides of the bed-piece. Rods $c$ $c$, parallel to the axles $a'$ $a'$, are inserted in the side pieces, C C, and extend across the space between them, and swinging links or levers D D connect the axles $a'$ $a'$, respectively, with the corresponding rods, $c$ $c$. Each of the levers D D is preferably bifurcated at its upper and lower ends, the ears at the upper end of each lever lying just inside the side bars, C C, and the ears at the lower ends of each lever being provided with outwardly-extending hollow gudgeons $d$, whose outer ends are in contact with the inner faces of the wheel-hubs. A block, E, is pivoted on the rear axle, $a'$, between the ears $a$ of the bifurcated bed-piece A, and a nut, G, midway between the rear ends of the side pieces, C C, is provided with trunnions $g$, whose ends are journaled in said side pieces. A lever, F, screw-threaded through a portion of its length passes through and engages the nut G, and has at its upper end a handle, $f$, for operating it, and at its lower end a head, $f'$, which is swiveled in the block E. This lever not only serves as a handle or rigid tongue for the operation of the truck when the platform is in any given position, but also provides an effective means for raising and lowering the platform, as desired. It is evident that turning the screw-threaded lever in one direction or the other increases or decreases the distance of the nut G from the block E, and thus raises or lowers the platform; and since the block E is pivoted on the axle $a$ the entire lever is free to swing backward or forward about the axle to accommodate itself to the change of position of the platform caused by the oscillation of the levers D.

The use of this truck is the same as that of other trucks of the same general class, its special value being for handling stoves, refrigerators, and other heavy articles supported by short legs.

In use the platform is lowered, the truck is run under the body of the structure to be moved, and the platform is then raised until it lifts the body and legs free from the floor or ground on which the structure stands, when the truck may be moved, as desired.

I am aware that trucks with vertically-adjustable platforms are already in use; but in all prior forms, so far as I know, the adjustment of the platform has been controlled and effected by the oscillation of a swinging lever, and not by the use of a screw. The screw not only gives greater power than the lever, but it permits the holding of the platform in any desired position, since the friction of the screw forms a sufficient lock to prevent accidental descent of the platform.

I have described the construction of this form of truck in detail, in order that it may be clearly and readily understood; but I do not mean to imply that all the details of construction shown and described are material or essential, as many of them may evidently be varied without changing the operation of my invention.

Having now described and explained my invention, what I claim as new, and desire to secure by Letters Patent, is—

1. In a hand-truck, the combination, with a suitable bed and its supporting-wheels, of a platform above the bed, oscillating levers connecting the bed and platform and supporting the latter, and a screw also connecting the bed and platform and adapted by its rotation to raise and lower the platform.

2. The combination, with the bed of a truck and its supporting-wheels, of a platform above the bed, oscillating levers connecting the bed and platform and supporting the latter, a block pivoted to the bed, and a nut pivoted to the platform, and a screw passing through the nut and swiveled in the block and adapted by its rotation to raise and lower the platform.

3. The combination of the bed A, axles $a'$, and wheels B, the platform C C, and levers D D, the pivoted block E and pivoted nut G, and the screw-threaded lever F, engaging the nut G and having a head, $f$, swiveled in the block E, substantially as and for the purpose set forth.

In testimony whereof I have signed this specification in the presence of two subscribing witnesses.

FRED W. HOEFER.

Witnesses:
R. H. WILES,
J. A. CRAIN.